(12) United States Patent
Hastwell et al.

(10) Patent No.: US 8,958,318 B1
(45) Date of Patent: Feb. 17, 2015

(54) EVENT-BASED CAPTURE OF PACKETS FROM A NETWORK FLOW

(75) Inventors: John Hastwell, Bedforshire (GB);
Marco E. Foschiano, Pinerolo (IT);
Ravichandra Ryali, Milpitas, CA (US);
Nirmalendu Das, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 571 days.

(21) Appl. No.: 13/238,493

(22) Filed: Sep. 21, 2011

(51) Int. Cl.
*G01R 31/08* (2006.01)

(52) U.S. Cl.
USPC ............................ 370/252; 370/389; 370/400

(58) Field of Classification Search
None
See application file for complete search history.

(56) References Cited

U.S. PATENT DOCUMENTS

| | | | |
|---|---|---|---|
| 6,308,148 B1 | 10/2001 | Bruins et al. | |
| 6,981,181 B2* | 12/2005 | Dun et al. | 714/39 |
| 7,120,931 B1 | 10/2006 | Cheriton | |
| 7,257,736 B2* | 8/2007 | Dunn et al. | 714/39 |
| 7,257,737 B2* | 8/2007 | Dun et al. | 714/39 |
| 7,260,518 B2 | 8/2007 | Kerr et al. | |
| 7,391,739 B1* | 6/2008 | Taylor et al. | 370/253 |
| 7,627,669 B2* | 12/2009 | Dugatkin et al. | 709/224 |
| 7,804,832 B2 | 9/2010 | Andrews et al. | |
| 7,859,856 B2* | 12/2010 | Lanning | 361/788 |
| 2002/0015387 A1* | 2/2002 | Houh | 370/250 |
| 2002/0016708 A1* | 2/2002 | Houh | 703/26 |
| 2002/0016937 A1* | 2/2002 | Houh | 714/43 |
| 2003/0195958 A1* | 10/2003 | Byron et al. | 709/224 |
| 2006/0053344 A1* | 3/2006 | Dun et al. | 714/39 |
| 2007/0260933 A1* | 11/2007 | Siu | 714/39 |
| 2007/0294378 A1* | 12/2007 | Olgaard et al. | 709/223 |
| 2008/0172588 A1* | 7/2008 | Olgaard | 714/742 |
| 2010/0260204 A1* | 10/2010 | Pepper et al. | 370/474 |
| 2011/0211593 A1* | 9/2011 | Pepper et al. | 370/474 |

OTHER PUBLICATIONS

"Monitoring the Adaptive Security Appliance", Cisco ASA 5580 Adaptive Security Appliance Command Line Configuration Guide, Chapter 39, pp. 39-1 through 39-38, 2008.

* cited by examiner

*Primary Examiner* — Bob Phunkulh
(74) *Attorney, Agent, or Firm* — Edell, Shapiro & Finnan, LLC

(57) ABSTRACT

An apparatus and method for event-based data capture from network flows are provided. At a network device, a network flow is received that comprises a plurality of packets each comprising control information and data. The network flow is monitored for the occurrence of at least one predetermined triggering event. In response to detecting the triggering event, at least a portion of one or more of the packets received after the triggering event is captured, and the captured portion is exported to an analysis server. The network device may comprise any device configured to forward flows of packets such as, for example, switches, routers, firewalls, etc.

21 Claims, 4 Drawing Sheets

EVENT-BASED CAPTURE OF PACKETS FROM A NETWORK FLOW

TECHNICAL FIELD

The present disclosure relates to the capture of packets from a network flow.

BACKGROUND

In a packet switched or packet mode computer network, data is transmitted in the form of packets (sometimes referred to as datagrams, segments, blocks, cells or frames) according to predefined protocols, such as the Transmission Control Protocol/Internet Protocol (TCP/IP). A sequence of packets transmitted from a source to a destination is referred to as a network flow.

Packets generally contain control information and actual data (also known as payload). The control information is data that network devices use to forward the packet from a source to a destination, and may comprise, for example, source and destination addresses, error detection codes (i.e., checksums), sequencing information, etc. This control information is generally found in a portion of the packet referred to as the packet header (i.e., the information that precedes the actual data within the packet) and/or the packet trailer (i.e., the information that follows the actual data within the packet). Packets are routed in the network on the basis of this control information.

DESCRIPTION OF EXAMPLE EMBODIMENTS

Overview

An apparatus and method for event-based data capture from network flows are provided. At a network device, a network flow is received that comprises a plurality of packets each comprising control information and data. The network flow is monitored for the occurrence of at least one predetermined triggering event. In response to detecting the triggering event, at least a portion of one or more of the packets received after the triggering event is captured, and the captured portion is exported to an analysis server. The network device may comprise any device configured to forward flows of packets such as, for example, switches, routers, firewalls, etc.

Example Embodiments

Figure 1:
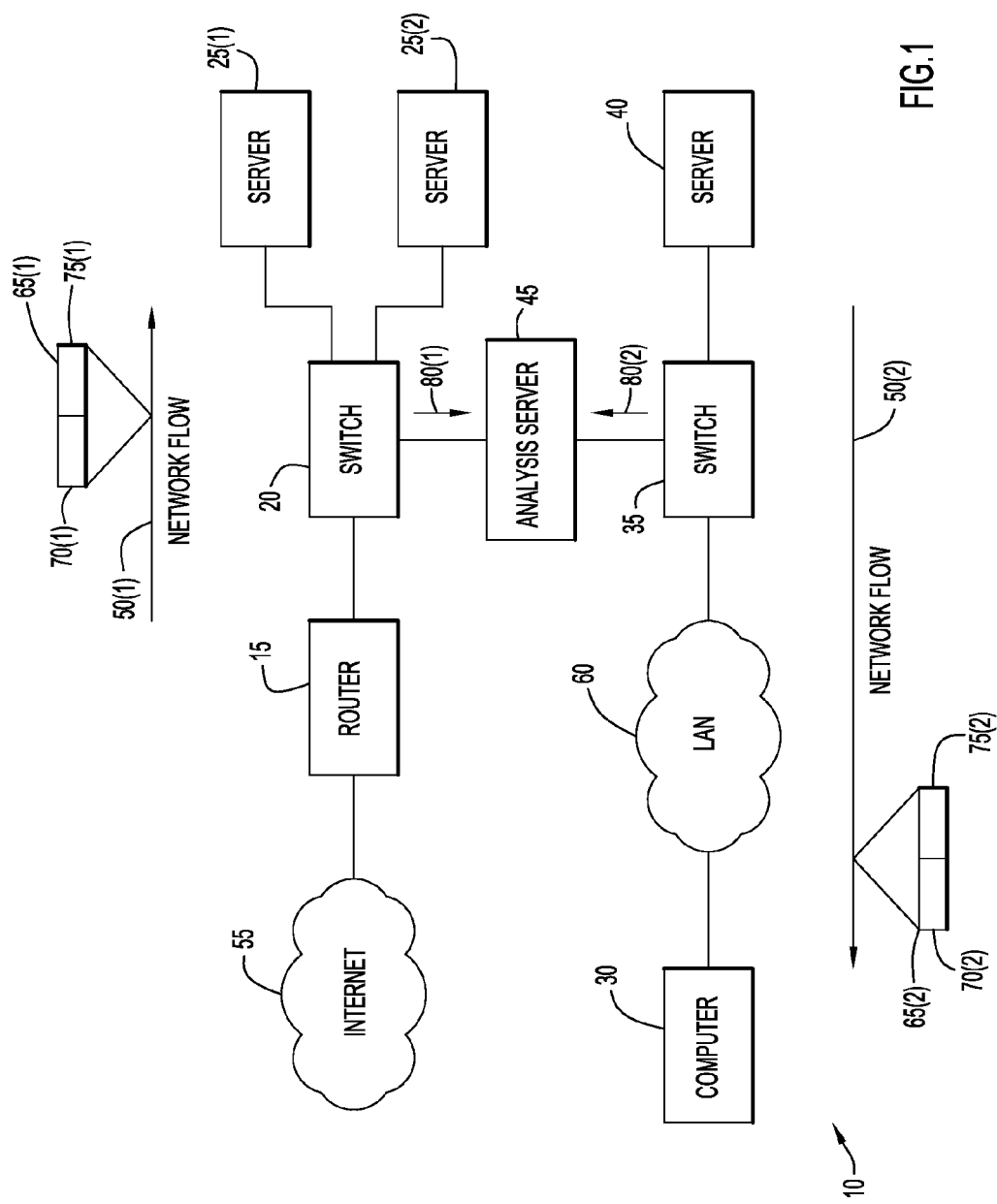
FIG. 1 is a block diagram of an example packet switching network having one or more network devices configured to capture actual data in a network flow following detection of a triggering event.

FIG. 1 is a block diagram of a packet switching computer network 10. As shown, network 10 comprises a router 15, switch 20, servers 25(1) and 25(2), computer 30, switch 35, server 40, and an analysis server 45.

In a packet switched computer network, such as network 10, data is transmitted in the form of packets, and a sequence of packets is referred to as a network flow. Router 15 and switch 20 are configured to bi-directionally transfer network flows between servers 25(1)/25(2) and the Internet 55. That is, router 15 and switch 20 are configured to direct packets received over the Internet 55 to servers 25(1) or 25(2), as well as to direct packets generated by servers 25(1) or 25(2) to destination devices via the Internet 55. In the example of FIG. 1, a first network flow, network flow 50(1), is received by router 15 from the Internet 55 and forwarded to server 25(1) via switch 20.

Router 15 is a network device that functions as the edge device for communication over the Internet 55. In other words, router 10 is the device that receives packets from, or forwards packets to, other devices over the Internet 55. Switch 20 is a network device that uses a combination of hardware and/or software to direct packets to one or both of servers 25(1) and 25(2). In certain circumstances, router 15 or switch 20 may include firewall hardware/software designed to prevent certain communications based on network policies. Switch 20 may also include load balancing hardware/software to distribute workload across servers 25(1) and 25(2).

Also as shown in FIG. 1, a second network flow, network flow 50(2), passes from server 40 to computer 30 via switch 35 and Local Area Network (LAN) 60. Switch 35 may be similar to switch 20 and facilitates the bi-directional transfer of packets between computer 30 and server 40.

As noted above, network flows 50(1) and 50(2) each comprise a sequence of packets. FIG. 1 schematically illustrates an example of a packet 65(1) of network flow 50(1), as well as an example packet 65(2) for network flow 50(2). Packets 65(1) and 65(2) contain control information 70(1) and 70(2), respectively, and actual data 75(1) and 75(2), respectively. Control information 70(1) and 70(2) includes data that network devices (i.e., router 15, switch 20 and switch 35) use to forward packets 65(1) and 65(2) from a source to a destination.

Packets 65(1) and 65(2) also include actual data 75(1) and 75(2), respectively. This actual data 75(1) and 75(2) is the data that is carried in the packet and transmitted from a source to a destination. The actual data may comprise audio data, video data, image data, numeric data, alphanumeric data, voice data, etc. In the example of FIG. 1, switches 20 and 35 are each configured to capture a portion of actual data (or packets) from network flows 50(1) and 50(2), respectively. More specifically, and as described in greater detail below, switches 20 and 35 are configured to monitor network flows 50(1) and 50(2), respectively, to detect the occurrence of a network event that indicates a desire to begin the capture of actual data. The detected event is referred to herein as a network event of interest or triggering event because the detection of the event "triggers" switches 20 and 35 to begin the data capture.

Examples are described herein with reference to the capture of entire packets by switches 20 and/or 35. However, it is to be appreciated that this is merely illustrative, and that only portions of the packets (e.g., actual data or control information within the packets) may be captured.

Packets captured by switches 20 and 35 are exported to analysis server 45. The export of packets from switches 20 and 35 is shown in FIG. 1 by arrows 80(1) and 80(2), respectively.

As used herein, analysis server 45 is one or more devices (or software processes executing on one or more computing devices) that collect the exported data and perform one or more analysis and inspection operations thereon. The packets may be transmitted from switches 20 and 35 directly to analysis server 45 or via one or more additional network devices, or the packets may be temporarily stored before being forwarded to the analysis server. As such, analysis server 45 may communicate with switches 20 and 35 over a LAN or a WAN, such as the Internet 55.

As noted above, in the example of FIG. 1, packets are captured by switches 20 and 35. It is to be appreciated that the data capture techniques described herein are not limited to specific types of network devices, such as switches, but rather may be implemented in any network device that forwards, discards or processes traffic flows. For example, the data capture techniques described herein may be implemented as part of a firewall, Application Acceleration device, router (e.g., Multiprotocol Label Switching (MPLS) router), etc. Merely for ease of illustration, techniques will be described herein with reference to implementation of the data capture techniques in a switch, and, more particularly, switch 20 of FIG. 1.

Figure 2:
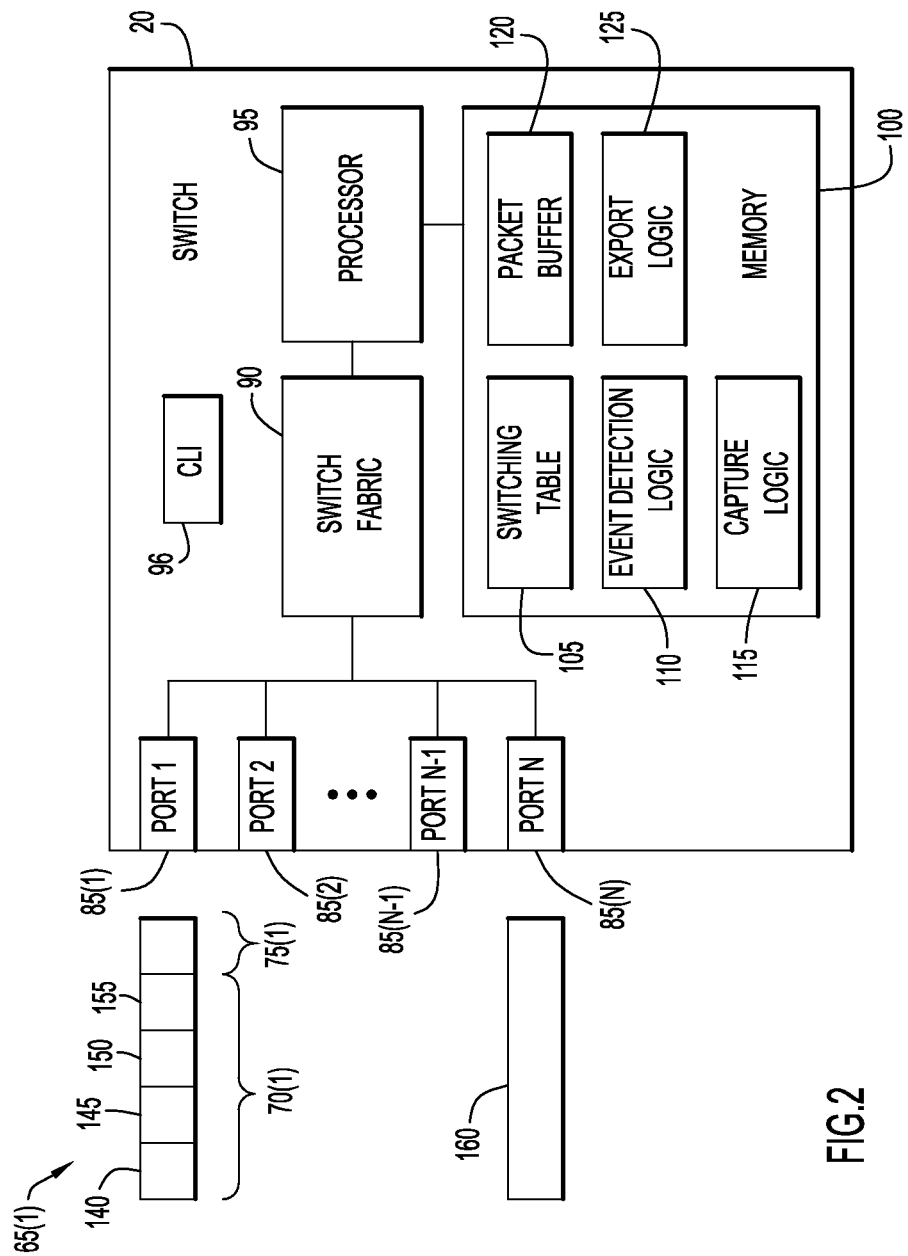
FIG. 2 is a block diagram of an example network device configured to capture actual data in a network flow following detection of a triggering event.

FIG. 2 is a block diagram of one arrangement of switch 20 from FIG. 1 configured to capture packets from network flow 50(1) in response to a triggering event. As shown, switch 20 comprises a plurality of network ports 85(1)-85(N), a switch fabric 90, a processor 95, command-line interface (CLI) 96, and memory 100. Switch fabric 90 is one or more application specific integrated circuits (ASICs) that are configured to process packets for routing among the network ports. Memory 100 comprises a switching table 105, event detection logic 110, capture logic 115, a packet buffer 120, and export logic 125.

It is to be appreciated that a switch, such as switch 20, may have different arrangements in order to direct traffic in a computer network. Although only one example arrangement of switch 20 is shown, it is to be appreciated that techniques described herein may also be implemented in other arrangements. It is also to be appreciated that switch 35 may have the same or different arrangement as switch 20 in order to capture packets from network flow 50(2) in response to a triggering event.

In operation, packets in network flow 50(1) are received at a first port 85(1) of switch 20, and then forwarded to a destination via a second port (one of ports 85(2)-85(N)). FIG. 2 schematically shows packet 65(1) received at port 85(1). As previously noted, packet 65(1) includes control information 70(1) and actual data 75(1). In the example of FIG. 2, control information 70(1) includes a destination Media Access Control (MAC) address 140, a source MAC address 145, a type indicator 150, and Cyclic Redundancy Check (CRC) information 155. The switching of packet 65(1) to a second port is performed by switch fabric 90 and processor 95 through the use of switching table 105. More specifically, switching table 105 includes a number of positions that each include an entry of information indicating how switching is to be performed between the ports 85(1)-85(N). Generally, an entry in switching table 105 includes a MAC address for a destination device and an output port identifier that identifies the output port that is associated with the destination MAC address. When switch 20 receives packet 65(1), the destination MAC address 140 is identified, and processor 95 locates an entry in switching table 105 that has a MAC address corresponding to the destination MAC address 140. Once this entry is located, the received packet 65(1) is forwarded, via switch fabric 90, to the output port specified in the located entry. If the destination address is not found in switching table 105, switch 20 is unable to determine which port to forward the packet 65(1). In this circumstance, a flooding process is performed in which the packet 65(1) is sent to all ports, except the port from which it came (i.e., the incoming port). The operation of switches for forwarding packets is well known and will not be described in further detail herein.

Switch 20 is configured to capture packets as they pass through switch 20. More specifically, the packets (and thus network flow 50(1)) are monitored by processor 95 through the implementation of event detection logic 110 in memory 100. That is, event detection logic 110 is a software process that, when executed by processor 95, enables the processor 95 to monitor the network flow for the occurrence of one or more predetermined events that trigger processor 95 to begin the capture of packets. As noted above, these events are referred to herein as triggering events. Event detection logic 110 may enable processor 95 to monitor network flow 50(1) and detect a number of different, precisely or generally defined, triggering events. Example detectable triggering events may include, for example, Address Resolution Protocol (ARP) inspection violations (e.g., dynamic ARP inspection (DAI) violations), Dynamic Host Configuration Protocol (DHCP) snooping violations, Internet Protocol (IP) spoofing attacks (e.g., IP Source Guard violations), port security violations, logged access control list (ACL) permits (e.g., RACL-permit-logged traffic, VACL-permit-logged traffic, PACL-permit-logged traffic) and denies (e.g., RACL-deny-logged traffic, VACL-deny-logged traffic, PACL-deny-logged traffic), Neighbor Discovery Protocol (NDP) inspection violations, IP compliant traffic, 802.1x authentication events (successes and/or failures), script actions, etc.

FIG. 2 illustrates an example in which event detection logic 110 comprises one or more software processes executable from memory 100. It is to be appreciated that the event detection logic is not necessarily software, but rather may comprise hardware elements. For example, hardware-based event detection logic (e.g., hardware based End-User Experience Monitoring (EEM)) may, for example, monitor certain states and inform the processor if that state changes (e.g., monitoring a link and detecting a link failure as a state change). Therefore, it is to be appreciated that the event detection logic may be, in alternative arrangements, deployed as hardware-based monitoring/triggering mechanisms.

It is to be appreciated that several different network flows may be simultaneously received and processed by switch 20. In certain circumstances, processor 95 may simultaneously monitor these different network flows for the occurrence of the same or different triggering events. If triggering events are detected in different flows, processor 95 will, as described further below, simultaneously capture packets from the different network flows. The ability to simultaneously monitor network flows and capture different sets of data may be limited by, for example, the operating speed of processor 95 and/or various hardware constraints of switch 20.

In certain circumstances, switch 20 is configured to permit a network manager or other user to define triggering events. More specifically, switch 20 includes CLI 96 that allows the user to interact with processor 95 and event detection logic 110 to set any user-defined triggers capable of being expressed as part of, for example, an Embedded Event Manager (EEM) script. Other methods for setting triggering events may be implemented.

Once a triggering event is detected, processor 95 executes capture logic 115 to capture one or more packets or, as noted above, to capture at least a portion of one or more packets. That is, capture logic 115 is software that, when executed by processor 95, enables the processor to capture packets (or actual data). This data capture occurs after the detection of the triggering event, and may take several different forms. In one example, processor 95 captures only the actual data within the packets, while in other examples processor 95 also captures a portion, or all of, the control information in the packets. As such, in certain circumstances, processor 95 captures entire packets.

It is to be appreciated that the techniques described herein may result in the capture of different numbers of packets or portions thereof (i.e., actual data and/or control information). In one arrangement, capture logic 115 is configured to capture a plurality of contiguous packets subsequent to the triggering event. That is, in certain circumstances, capture logic 115 does not capture a single packet, or trigger the random or pseudo-random, sampling of packets, but rather captures a contiguous (consecutive) string or burst of packets related to the triggering event.

Additionally, capture logic 115 can be configured to capture packets in return network flows. More specifically, it is assumed that a first network flow (flow 1) is transmitted from a source device (device A) to a second network device (device B). This first network flow (flow 1) is unidirectional. However, the second network device (device B) may respond to the receipt of flow 1 by transmitting a reverse or return flow (flow 2). That is, flow 2 is a second network flow transmitted from device B back to device A. A triggering event may be detected in flow 1 that causes capture logic 115 to commence the capture of packets. In response to receipt of flow 1, device B transmits flow 2 back to device A. In examples described herein, capture logic 115 recognizes that flow 2 was transmitted in response to flow 1 (i.e., the flow that caused the triggering event), and, as such, capture logic 115 may also capture packets from flow 2. This may provide added context as to, for example, the cause of the triggering event.

The capture of packets from a reverse or return flow may be facilitated in a number of different ways (e.g., monitoring destination and source IP addresses, port numbers, etc.) In one example, return flow capture is facilitated by monitoring the IP addresses in the packets. Referring to the above example, the packets in flow 1 will include an IP address (e.g., MAC address) for device A (the source IP address) and an IP address for device B (the destination IP address). Similarly, the packets in flow 2 will include an IP address for device B (the source IP address) and an IP address for device A (the destination IP address). By monitoring these source and destination address, capture logic 115 can determine when a network flow is a return flow subsequent to a triggering event. If such a return flow is detected, capture logic 115 can then capture one or more packets from that flow.

After one or more packets are captured by processor 95, the packets may be temporarily stored in packet buffer 120 and then exported to analysis server 45 (FIG. 1) via one of the ports 85(1)-85(N). Buffer 120 may comprise, for example, a first-in first-out (FIFO) buffer.

The packets are exported by processor 95 through the implementation of export logic 125. That is, export logic 125 is software that, when executed by processor 95, enables the processor to transmit the captured packets to analysis server 45. Due to this export capability, the packets are not stored in memory 100 for an extended period of time, thus limiting the amount of memory utilized.

In certain ones of the above and other triggering events, packets are denied or dropped by switch 20. However, these dropped packets may be useful to analysis server 45 in characterizing the triggering events and understanding the contents of network flow 50(1). As such, techniques described herein also capture these dropped packets. This may be facilitated by capture logic 115 copying any dropped packets and storing those packets in packet buffer 120 for export.

In certain embodiments, export logic 125 enables processor 95 to generate objects that include the captured packets as well as other information for transmission to analysis server 45. These objects are referred to herein as export objects and an example export object 160 is shown at port 85(N) in FIG. 2. The other information contained in the export objects may include, for example, statistics representative of the network flow (flow statistics such as packet and byte counts, relative utilization of links, etc.), statistics or other information regarding or representative of the triggering event (the type, duration, etc., of the triggering event that resulted in the capture of a packet), date/time stamps, route information, etc.

Export object 160 generated by processor 95 may have different formats depending on, for example, the arrangement and/or capabilities of switch 20 and/or analysis server 45. That is, the packets and other information may be packaged in a number of different ways for export and subsequent use by analysis server 45. In one example, the export objects may be in a format similar to Cisco's NetFlow scheme in which information is exported using User Datagram Protocol (UDP) or Stream Control Transmission Protocol (SCTP) packets. Alternatively, the export objects may be in accordance with the Internet Protocol Flow Information eXport (IPFIX) standard.

In one form, the format of export object 160 is predetermined in export logic 125. In another form, the format of data object 160 is selected from one of a number of different formats provided by export logic 125. This selection may be based on the type/arrangement of switch 20, information received from analysis server 45, information collected from the captured packets, etc. Alternatively, export logic 125 is configured to enable a customized, user-defined format for export object 160 using information received via CLI 96. That is, a user may define one or more templates for use in exporting packets to analysis server 45.

In certain circumstances, export logic 125 is configured so that the entire captured packets are exported as part of export object 160. However, in other examples, only a portion of the captured packets may be exported for further analysis. For example, only the actual data and/or control information in the captured packets may be exported. In one specific example, only the first N-bytes of the data in a packet, rather than the entire payload, may be exported.

Depending on the triggering event, slightly different processing operations may be performed to capture and export packets. In general, it is expected that the capture logic 115 enables processor 95 to collect packets matching specific criteria, and temporarily store those packets in buffer 120. The packets may be stored along with a description of the triggering event (for example, an exception code, or a feature code, message code or the equivalent thereof). A global command may also be provided to specify the maximum length of an exported packet and, if a packet's length exceeds such maximum, truncation is performed. In certain circumstances, when the utilization of buffer 120 reaches a certain predefined threshold, or a maximum predefined delay elapses (e.g., 1 second), the buffer is flushed and the contents are packaged into one or more export packets (e.g., UDP based) to be sent to analysis server 45.

In the example of FIG. 2, event detection logic 110, capture logic 115, and export logic 125 are software processes stored in memory 100. The memory 100 may comprise read only memory (ROM), random access memory (RAM), magnetic disk storage media devices, optical storage media devices, flash memory devices, electrical, optical, or other physical/tangible memory storage devices. Processor 100 is, for example, a microprocessor or microcontroller that executes the instructions for the event detection logic 110, capture logic 115, and export logic 125 stored in memory 100. Thus, in general, the memory 100 may comprise one or more tangible computer readable storage media (e.g., a memory device) encoded with software comprising computer executable instructions and when the software is executed (by processor 95) it is operable to perform the operations described herein in connection with event detection logic 110, capture logic 115, and export logic 125.

It is to be appreciated that techniques described herein may be implemented in different types of network devices, such as, for example, switches, routers, firewalls, etc.

In summary of above, switch 20 of FIG. 2 implements an event-based data capture and export functions. When the occurrence of a triggering event is detected, a contiguous set of network packets is captured and the packets exported to an analysis server.

Figure 3:
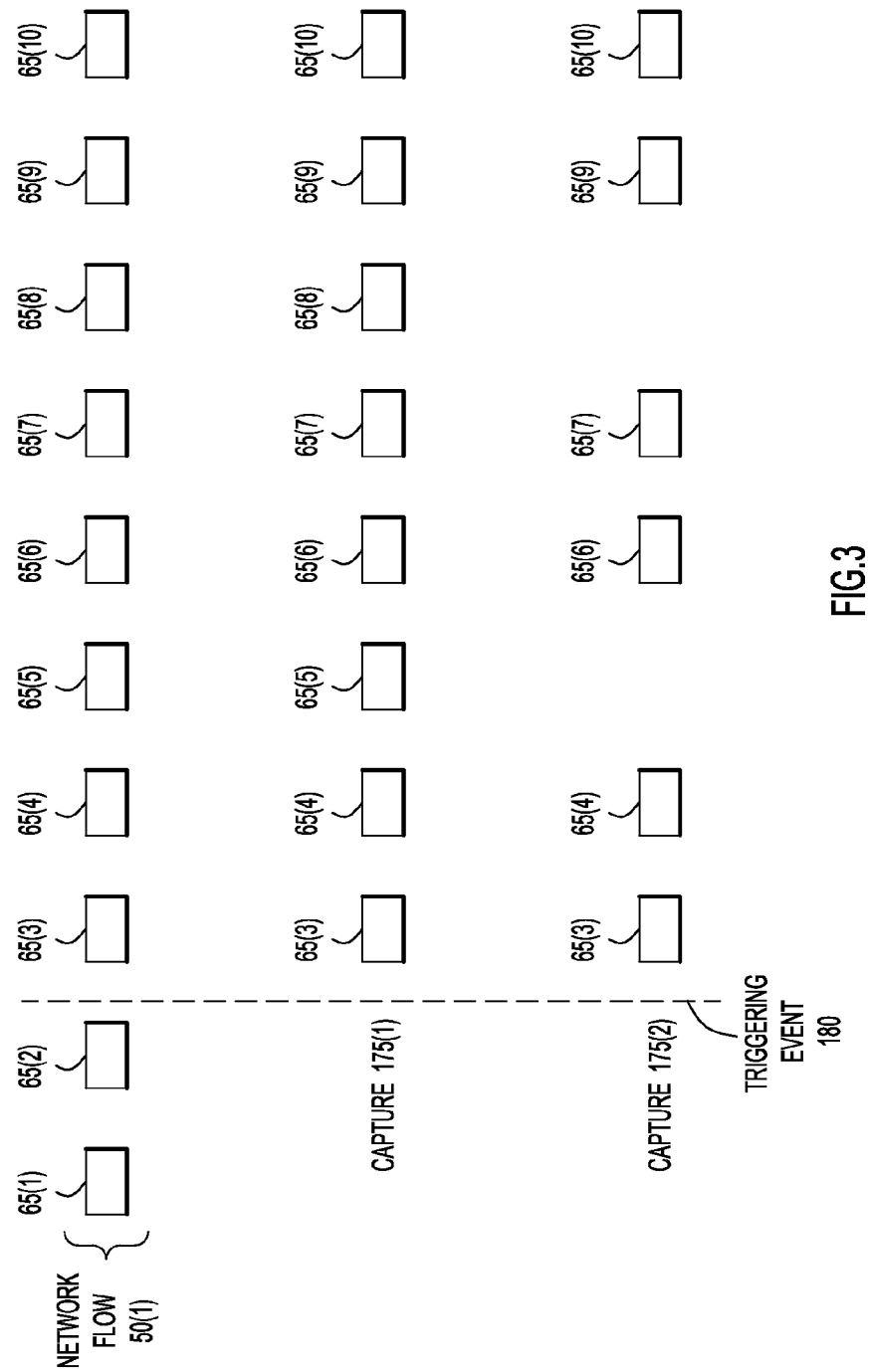
FIG. 3 is a schematic diagram illustrating the capture of actual data following detection of a triggering event.

FIG. 3 is a schematic diagram illustrating the capture of packets following detection of a triggering event. More specifically, FIG. 3 first illustrates network flow 50(1) comprising ten packets, packets 65(1)-65(10), as well as two example data captures, data capture 175(1) and 175(2).

As shown, a triggering event 180 is detected after packet 65(2) in network flow 50(1), and the capture of packets commences. In capture 175(1), all subsequent packets (packets 65(3)-65(10)) in network flow 50(1) are captured by processor 95. That is, capture 175(1) results in the capture of a contiguous (continuous) set of packets.

A feature of the capture and export techniques described herein is that the data capture does not overly burden the potentially limited resources of processor 95. As such, the data capture may be rate limited so that processor 95 may continue normal operation without being overburdened by the capture of an excessive amount of data. Capture 175(2) illustrates a rate-limited capture in which certain subsequent packets, namely every third packet (packets 65(5) and 65(8)), are omitted from the capture. This rate limiting may be implemented through software or hardware-based rate limiting mechanisms, described below.

In processor-based security features (e.g., ARP snooping, DHCP snooping, etc.), a packet is analyzed by processor 95 before the packet is allowed to pass. Such processor-based features have associated rate limits in which if the incoming packet rate is greater than an acceptable threshold, the corresponding port (on which the packets are received) will be disabled. Therefore, certain aspects described herein using such processor-based triggering events are inherently rate-limited to protect processor 95 from overload. In other words, since packets are being captured at the tail-end of the processor-based features, the system is protected by the same rate limiting mechanism. However, capture logic 115 and export logic 125 allow processor 95 to export data that indicates when the port was disabled so that the analysis server 45 can extrapolate the incoming packet rate based on whatever it actually receives. The use of the processor-based functionality is referred to as a software-based rate limiting mechanism.

Hardware-based rate limiting mechanisms are used for triggering events that occur as a result of features that filter the packets using hardware filters (e.g., ACL violations, 8021x events, etc.) In such circumstances, the rate limiting is accomplished by re-programming the hardware to prevent forwarding of packets to processor 95 during fixed time intervals. The time intervals are selected so as to prevent overburdening of processor 95 and may be based on, for example, empirical data or known/determined hardware and/or processor capabilities. Once the hardware-based rate limiting mechanism is triggered, only a certain number of packets are processed within a certain period of time.

Another limiting mechanism is through control-plane policing. Control-plane policing allows the size of captured bursts (i.e., contiguous groups of packets) to be configured ahead of time. After the predetermined number of packets is captured, remaining packets will be dropped in the hardware. However, a count of how many packets have been dropped is maintained. Such operations eliminate the use of time-intervals to switch on/off the virtual port.

The rate-limiting processes ensure that processor 95 is not overburdened by the packet processing, while still delivering a sufficiently large amount of data to analysis server 45. It is to be appreciated that faster processors will deliver more packets, while slower processors will deliver less packets in the same amount of time. Therefore, analysis and monitoring will be faster with a faster switch control plane, while it will take more time with a slower control plane.

As previously noted, in certain circumstances processor 95 may monitor multiple network flows and simultaneously capture packets from a plurality of flows.

In certain circumstances, export logic 125 maintains a statistics counter that counts the number of packets that have been exported by switch 20 to analysis server 45, and not the number of packets that have reached the input port or processor 95 of the switch. When provided to analysis server 45, this statistic allows the analysis server 45 to determine how many packets were omitted due to, for example, sample rate limitations.

The techniques have been primarily described herein with reference to the capture of either permitted or dropped packets by a network device (e.g., switch, router, firewall, etc.) Dropped packets are generally inspected in closed systems implementing strict security policies, while permitted packets may be more useful for inspection in open (less strict) systems before policies are applied and/or in order to adapt policies to different traffic types and patterns. Additionally, as noted above, the capture of entire packets is merely illustrative, and the techniques described herein may be implemented to capture portions of the packets, such as the data in the packet (or a subset thereof), or the control information in the packet (or a subset thereof).

Furthermore, the techniques described herein are particularly useful to capture packets, but may be extended to also capture certain control plane traffic for logging and analysis purposes (e.g., 802.1x authentication events (successes and/or failures)). Control plane traffic refers to all traffic that is directed to or sent from the control plane (i.e., Central Processing Unit (CPU)) of the switch for management purposes. In specific arrangements, the techniques described herein may be used to transport/log control plane messages (e.g., certain Syslog messages) during bulk transfers, rather than individual transfers of the Syslog protocol.

Figure 4:
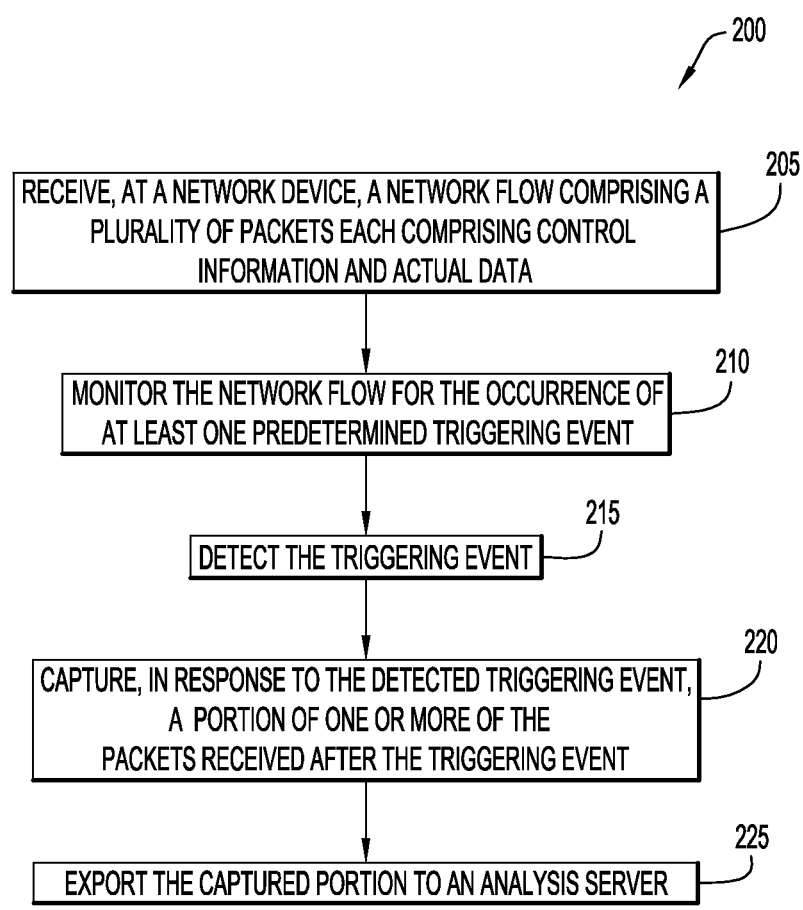
FIG. 4 is a flowchart of an example method for capturing actual data from a network flow in response to a triggering event.

FIG. 4 is a flowchart illustrating a method 200 for capturing at least a portion of one or more packets from a network flow in response to a predetermined network event. Method 200 begins at 205 where a network device receives a network flow comprising a plurality of packets. Each packet comprises control information (information for use in forwarding the packet through the computer network) and actual data (data being transmitted from a source to a destination). At 210, the received network flow is monitored for the occurrence of at least one predetermined triggering event. Example triggering events are described above with reference to FIG. 2. At 215, a triggering event is detected, thereby triggering the capture of at least a portion of one or more packets in the network flow at 220. That is, in response to the detected event, at least a portion of one or more packets (i.e., an entire packet, the data in the packet (or a subset thereof), or the control information in the packet (or a subset thereof)) of the network flow received after the triggering event, is captured. At 225, the captured portion, or a subset thereof, is exported to an analysis server.

The techniques described herein may be implemented in hardware or software. In the software-based techniques, the software may not utilize dedicated hardware components in the network devices. Instead, the software-based techniques may be assisted solely by conventional switch hardware, namely a processor and memory. As such, techniques described above may be used as a software add-on to conventional switches. Additionally, the techniques described herein provide, over a period of time, an accurate picture of the applications seen by a switch on its various ports and allow appropriate alerts and actions to be taken by a centralized rule-based analysis server.

The techniques described herein also provide network managers with a single mechanism to collect as much information as possible on different types of events in the network, such as certain alarms triggered by attempted security breaches or by the inspection (and policing) of malicious traffic. The techniques also allow for capture of longer histories of events since the actual data is only temporarily stored on the network device and then exported to an external agent (e.g., analysis server and/or other appliance), thereby providing application visibility at the edge of the network.

The techniques described herein may be implemented, for example, with Layer 2 and Layer 3 security features, including Internet Protocol version 4 (IPv4) and Internet Protocol version 6 (IPv6) security features. In addition, techniques described herein allow for the collection of bursts of traffic to provide the analysis server with full batches of packets substantially at the moment when a particular event occurs. This is advantageous as malicious events rarely manifest themselves with individual packets (e.g., denial-of-service (DoS) attacks, network scans, etc.).

It is to be appreciated that different communications protocols use different conventions for the format of a packet. The techniques described herein for the capture and export of packets from a network flow are not limited to any particular packet format or communication protocol. That is, the techniques described herein are protocol transparent and can be used with any protocol or frame format supported by the network devices.

The above description is intended by way of example only.

What is claimed is:

1. A method comprising:
receiving a network flow comprising a plurality of packets at a network device configured to process the network flow for forwarding toward a destination device, wherein upon receipt of the network flow the destination device is configured to generate a return flow that is processed by the network device;
monitoring the network flow at the network device for the occurrence of at least one of a plurality of predetermined triggering events that occur during processing of the network flow at the network device;
detecting the occurrence of a first triggering event during processing of the network flow;
capturing, in response to the detection of the first triggering event, a plurality of packets received after the triggering event;
generating an export object including a captured portion of the plurality of packets received after the triggering event and additional information regarding the network flow from which the plurality of packets were captured;
sending the export object to an analysis server; and
in response to detection of the first triggering event, capturing, at the network device, at least a portion one or more packets in the return flow.

2. The method of claim 1, the additional information includes statistics representative of the network flow.

3. The method of claim 1, wherein the additional information includes information relating to the triggering event.

4. The method of claim 1, wherein capturing a plurality of packets comprises:
capturing a plurality of contiguous packets in the network flow.

5. The method of claim 1, further comprising:
rate limiting the capture of the plurality of packets with a software-based rate limiting mechanism.

6. The method of claim 1, further comprising:
rate limiting the capture of the plurality of packets with a hardware-based rate limiting mechanism.

7. The method of claim 1, wherein capturing a plurality of packets comprises:
capturing a plurality of packets dropped by the network device.

8. The method of claim 1, wherein the triggering event is the dropping of one or more packets by the network device.

9. One or more non-transitory computer readable storage media encoded with software comprising computer executable instructions and when the software is executed operable to:
monitor a network flow received by a network device for the occurrence of at least one of a plurality of predetermined triggering events that occur during processing of the network flow at the network device, wherein the network device is configured to process the network flow for forwarding toward a destination device, wherein upon receipt of the network flow the destination device is configured to generate a return flow that is processed by the network device;
detect the occurrence of a first triggering event during processing of the network flow;
capture, in response to detection of the first triggering event, a plurality of packets received after the triggering event;
generate an export object including a captured portion of the plurality of packets received after the triggering event and additional information regarding the network flow from which the plurality of packets were captured;
cause the export object to be sent to an analysis server; and
in response to detection of the first triggering event, capture at least a portion of one or more packets in the return flow.

10. The non-transitory computer readable storage media of claim 9, wherein the additional information includes statistics representative of the network flow.

11. The non-transitory computer readable storage media of claim 9, wherein the additional information includes information relating to the triggering event.

12. The non-transitory computer readable storage media of claim 9, wherein the instructions operable to capture a plurality of packets comprise instructions operable to:
capture a plurality of contiguous packets in the network flow.

13. The non-transitory computer readable storage media of claim 9, further comprising instructions operable to:
rate limit the capture of the plurality of packets with a software-based rate limiting mechanism.

14. The non-transitory computer readable storage media of claim 9, wherein the instructions operable to capture a plurality of packets comprise instructions operable to:

capture a plurality of packets dropped by the network device.

15. The non-transitory computer readable storage media of claim 9, wherein the triggering event is the dropping of one or more packets by the network device.

16. An apparatus comprising:

a plurality of network ports, wherein a first one of the network ports is configured to receive a network flow originated by a source device;

a switch fabric configured to switch packets among the plurality of network ports for forwarding to a destination device, wherein upon receipt of the network flow the destination device is configured to generate a return flow that is received at one of the network ports;

a memory; and a processor connected to the switch fabric and the memory and configured to:

perform one or more processing operations on the network flow, monitor the network flow for the occurrence of at least one of a plurality of predetermined triggering event during the one or more processing operations, detect the occurrence of a first triggering event, capture, in response to the detected triggering event, a plurality of packets received after the triggering event, generate an export object including a captured portion of the plurality of packets received after the triggering event and additional information regarding the network flow from which the plurality of packets were captured, cause the export object to be sent to the analysis server, and in response to detection of the first triggering event, capture at least a portion of one or more packets in the return flow.

17. The apparatus of claim 16, wherein the additional information includes statistics representative of the network flow.

18. The apparatus of claim 16, wherein the additional information includes information relating to the triggering event.

19. The apparatus of claim 16, wherein the processor is configured to capture a plurality of contiguous packets in the network flow.

20. The apparatus of claim 16, wherein the processor is configured to capture a plurality of dropped packets.

21. The apparatus of claim 16, wherein the triggering event is the dropping of one or more packets.

\* \* \* \* \*